United States Patent [19]

Nehls

[11] Patent Number: 5,308,351
[45] Date of Patent: May 3, 1994

[54] EAR TAG

[75] Inventor: Reinhard Nehls, Bocholt, Fed. Rep. of Germany

[73] Assignee: Caisley International GmbH, Bocholt-Suderwick, Fed. Rep. of Germany

[21] Appl. No.: 793,404

[22] PCT Filed: Jul. 5, 1990

[86] PCT No.: PCT/EP90/01116

§ 371 Date: Mar. 5, 1992

§ 102(e) Date: Mar. 5, 1992

[87] PCT Pub. No.: WO91/00686

PCT Pub. Date: Jan. 24, 1991

[30] Foreign Application Priority Data

Jul. 11, 1989 [GB] United Kingdom ............... 8915879
Jul. 11, 1989 [GB] United Kingdom ............... 8915880

[51] Int. Cl.⁵ .................................................. G09F 3/00
[52] U.S. Cl. ................................... 606/116; 606/117; 40/300; 40/301
[58] Field of Search ............................ 606/1, 116, 117; 156/DIG. 23; 40/300, 301; 227/175, 329; D30/155

[56] References Cited

U.S. PATENT DOCUMENTS

| | | | |
|---|---|---|---|
| 3,184,874 | 5/1965 | Schofield | 40/301 |
| 3,826,030 | 7/1974 | Read | D30/155 |
| 3,958,353 | 5/1976 | Hayes | D30/155 |
| 4,581,834 | 4/1986 | Zatkos et al. | 40/300 |
| 4,646,455 | 3/1987 | Gardner | 40/300 |
| 4,694,781 | 9/1987 | Howe et al. | 40/301 |
| 4,920,671 | 5/1990 | Zatkos | 227/902 |

FOREIGN PATENT DOCUMENTS

| | | | |
|---|---|---|---|
| 0014584 | 8/1980 | European Pat. Off. | 40/301 |
| 0047697 | 3/1982 | European Pat. Off. | 40/301 |
| 0056533 | 7/1982 | European Pat. Off. | 40/301 |
| 0177201 | 4/1986 | European Pat. Off. | 40/301 |
| 8102068 | 11/1982 | Netherlands | 40/301 |

*Primary Examiner*—Stephen C. Pellegrino
*Assistant Examiner*—Glenn Dawson
*Attorney, Agent, or Firm*—Ware, Fressola, Van Der Sluys & Adolphson

[57] ABSTRACT

An ear tag having a first button with an aperture, and a pin having a head and a heel is attached to the first button via engagement of the heel in the aperture. A second button is provided having an aperture for engaging the head of the pin. At least one of the buttons has an additional frangible ring adjacent one of the apertures through which the pin is introduced and by which the pin engages the appropriate button. As force is applied to the buttons in opposite directions the additional ring breaks making the re-connection of the two buttons impossible.

20 Claims, 4 Drawing Sheets

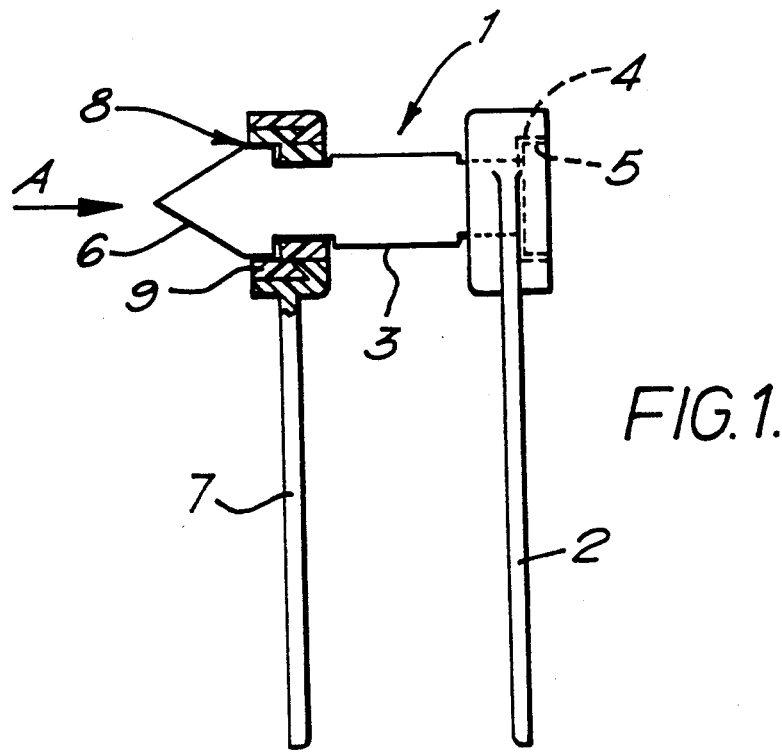
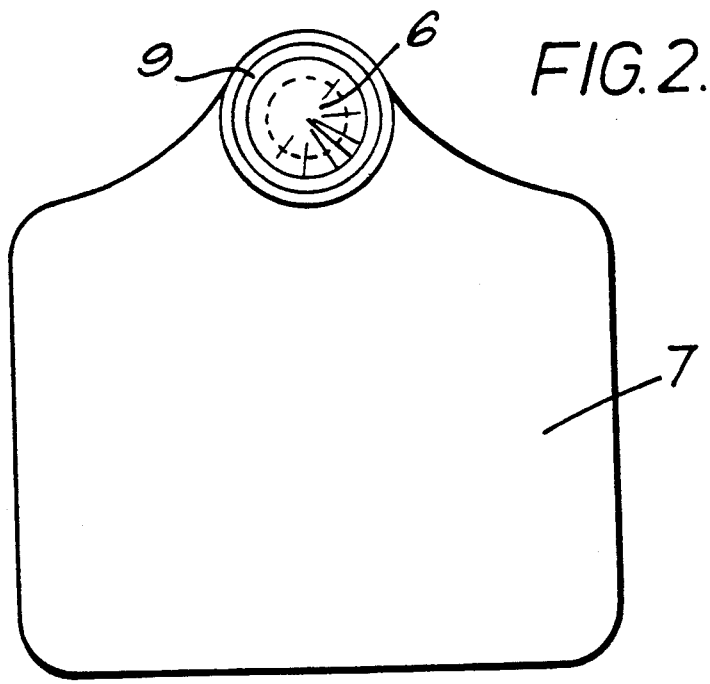

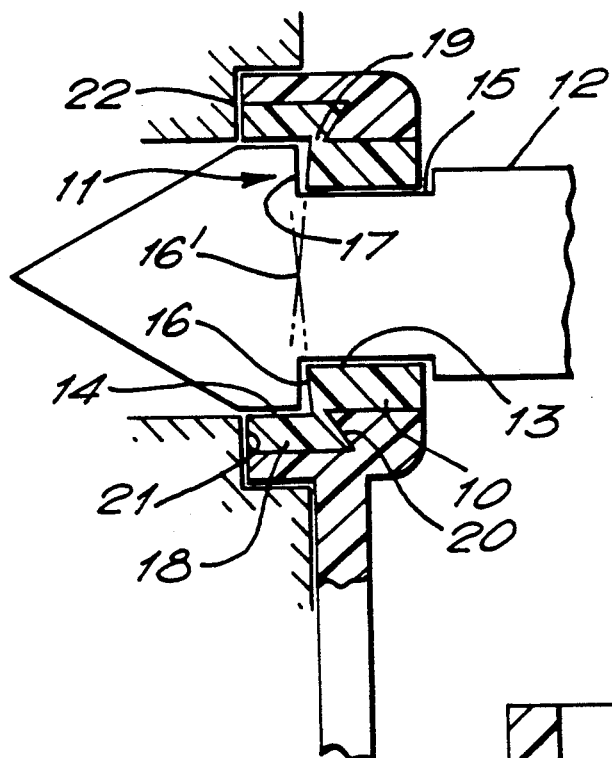
FIG.3.
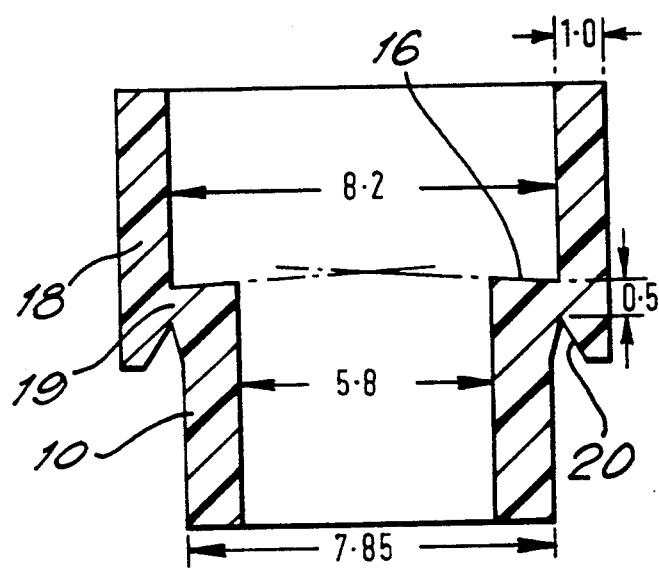
FIG.4.
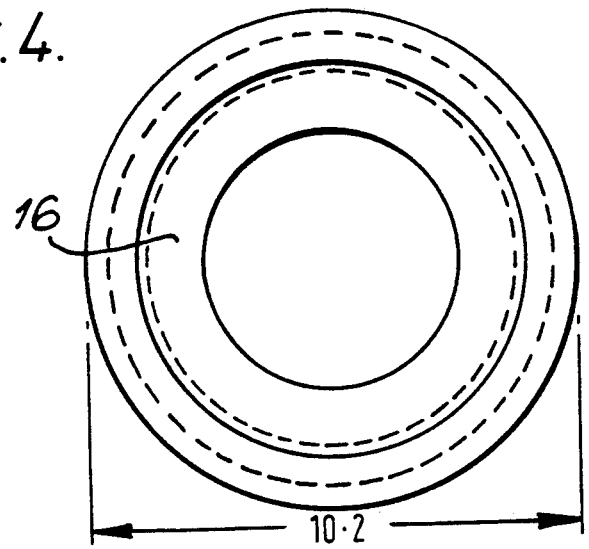

EAR TAG

FIELD OF THE INVENTION

The present invention relates to an ear tag for marking an animal.

BACKGROUND OF THE INVENTION

In European Patent Specification No: 92,408 B1, there is described an ear tag comprising a first button having an aperture, a pin having a head and a heel and being attached to the first button via engagement of the heel in the aperture prior to application of the tag to an animal, and a second button which is separate from the pin prior to application of the tag, the second button having an aperture in which the head of the pin is engaged on application of the tag.

On the prior tag, the buttons are of flexible plastics material, whereas the pin is of rigid plastics material. These material choices enable the tag to be readily applied to an animal's ear, and yet enable the tag to resist snagging in fences, gates etc., as can happen with tags of all rigid material. However, the prior tag and indeed other prior tags can on occasion be torn apart for illicit retagging of animals with the wrong tags.

THE INVENTION

The object of the invention is to provide a tamper-proof ear tag.

An ear tag according to the invention is characterized in that at least one of the buttons has an additional ring at the button's aperture and via which the pin engages the said button.

Whilst it is envisageable that the pin may be deformable on application of the tag, for instance by slitting, and that the additional ring may be rigid; the additional ring is preferably of resilient material and includes an internal bore of a size to permit passage of the head of the pin with resilient deformation of the additional ring on fitting of the pin to the said button and an axially facing seat for engagement behind the head or the heel of the pin when the additional ring recovers its shape after passage of the head.

The additional ring may be incorporated in the first button at the first button's aperture for engagement of the heel of the pin and/or in the second button at the second button's aperture for engagement of the head of the pin on application of the tag.

Conveniently the additional ring is an insert placed in its button's mold and around which the button is moulded.

In accordance with a particularly preferred feature, the additional ring comprises a separable annular element, which separates from the said button if excessive force is applied to remove the pin from the button and includes means for connecting the separable annular element to the said button adapted and arranged for separation of the annular element from the said button on application of excessive, pin removal force to the said button.

It is envisaged that the entire additional ring may be separable from tis button and constitute the separable annular element,. For its normal securement in its button, the additional ring may have a textured mating surface, providing a key for the button's material.

Alternatively as is preferred the additional ring has a weak region at which the separable annular element is frangible for separation of the said button from the pin on application of the excessive force.

In the preferred embodiment, the weak region is combined with an external contour of the additional ring adapted for engagement thereof in the said button.

In accordance with an important preferred feature, the weak region is provided at the outer diameter of the seat and the separable annular element has substantially this diameter whereby a bore at least as large as the head or heel of the pin is left it eh said button after separation.

Conveniently the additional ring extends to the outer surface of the said button, whereby axial force on the element during application of the tag is reacted to the fitting tool.

In the preferred embodiments, the additional ring has the effect of reinforcing the material of the button at its aperture where the pin is secured therein.

In accordance with a further improvement the additional ring has an outer enclosure member, whereby the head or heel of the pin, with whichever of which the additional ring is engaged, is enclosed.

The outer enclosure member may be integrally formed with the additional ring. Alternatively, the outer enclosure member may be secured to the additional ring after its formation as by welding.

Preferably, the enclosure member is provided with at least one ventilation aperture, Conveniently the additional ring is of moulded plastics material, preferably stronger than that of the said button. Alternatively, the additional ring is of non-corroding metal and is adapted for diametric expansion on fitting of the pin to the said button.

The invention is intended as an improvement in the ear tag described in european Patent Specification No: 92,408 B1. However it should be noted that it is applicable to other designs of ear tag.

To help understanding of the invention, two specific embodiments and variants thereof will now be described by way of example and with reference to the accompanying drawings, in which:

THE DRAWINGS

FIG. 1 is a partially broken away side view of an ear tag of the invention;

FIG. 2 is an end view of the ear tag in the direction of arrow A in FIG. 1;

FIG. 3 is a scrap view of the broken away portion of FIG. 1 on a larger scale;

FIG. 4 is a dimensioned cross-section and plan view of a frangible element for an ear tag of the invention, the dimensions being shown in millimetres;

FIRST PREFERRED EMBODIMENT

Figure 5:
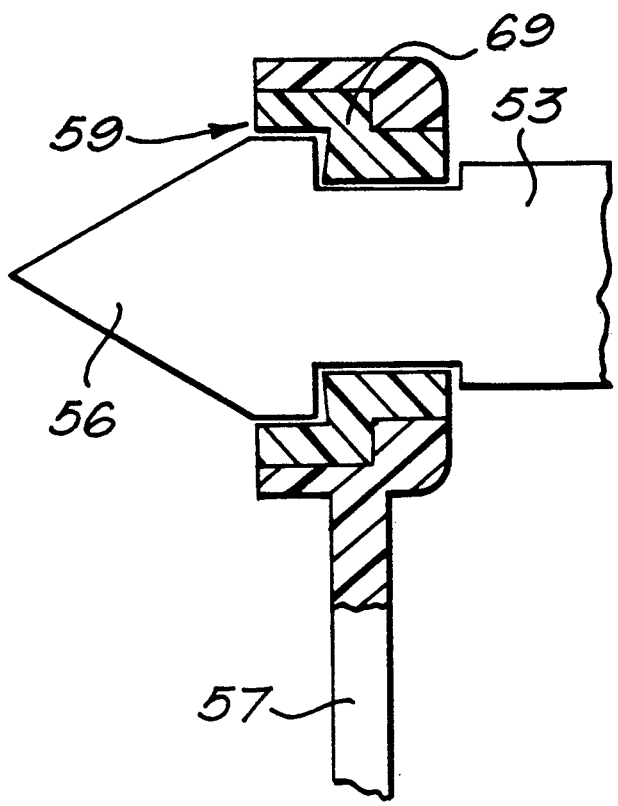
FIG. 5 is a view similar to FIG. 3 of a variant.

Referring to FIGS. 1 to 4 of the drawings, the animal ear tag 1 has a flexible, polyurethane material first button 2; a rigid nylon or the like material pin 3 with a heel 4 received in a recessed aperture 5 in the first button 2 and a pointer head 6; and a second, flexible polyurethane material button 7. Initially, the pin 3 and first button 2 are connected; and the second button 7 is separate. Then on application of the tag to an animal's ear (not shown), the head 6 is inserted into an aperture 8 in the second button. In accordance with a preferred feature of the invention, the tag is made tamperproof (in the sense that if it is forceably removed from the one animal, it cannot reliably be fitted to another) by means of a frangible ring 9 fitted in the aperture 8. The ring may be fitted into the second button after moulding of the button. However the ring is preferably assembled into the mould tool for the second button which is then molded around it. The ring is of different plastics material from the second button, namely a stronger, nylon material.

The ring has an internal diameter bore 11 to fit the stem 12 of the pin 3. The bore 11 is stepped, having a lesser diameter section 13 and a great diameter section 14. The lesser diameter section 13 is a clearance fit on a reduced diameter section 15 of the pin 3 to maintain the position of the second button at the head of the pin, as is conventional. The greater diameter section 14 is a clearance fit for the head 6 of the pin 3. A step 16 is provided between the two sections of the bore 11 for engagement behind the head. A particular feature is that the step face 16 is shallowly conical in the convex sense and having a virtual apex 16', to ensure that he ring 9 engages the head 6 inwardly on the underface 17 of the head 6.

The ring 9 is divided into a separable annular element 10 and a retained element 18 by a weak annular region 19. This region results form an external diameter step 20 which is undercut whereby the external contour of the ring is such that the ring firmly engages the second button when urged in the pin withdrawal direction A. When the pin is urged in this direction with excessive force—such as by a manual tearing action of approximately 40 Kg—the force is reacted at the weakened region 19 which breads. This allows the smaller diameter separable, annular element 10 to leave the second button and the tag comes apart. In particular, it should be noted that the external diameter of the lesser diameter element 10 is substantially the same diameter as the internal diameter of the greater diameter element 18. This results in the head 6 not being engaged by the material of the second button per se either during the forceable tearing of the tag or indeed subsequently if an attempt is made to reassemble the tag in another animal illicitly.

During original application of the tag, the separable element 10 is deformed in diametral expansion by the head 6 of the pin. The ring is not urged out of the second button due to abutment of the exposed free end 21 of the retained element with the jaw 22 of the application tool.

The pin 3 may be of solid, rigid plastics material or may have a transponder embedded in it. In the latter form, the invention is particularly useful, since it provides added security in knowing that the transponder has not been illicitly fitted to the wrong animal.

First Variant

In the variant of FIG. 56, the additional ring 59 does not have the undercut, weak annular region 19. The ring is of nylon material. At its step 69, it is of substantially uniform thickness, with the result that the ring 59 is not readily frangible. If an attempt is made to separate the tag, i.e. the pin 53 from the second button 57, the ring reinforces the button against removal of the pin. Should sufficient force be applied for removal of the pin, together with the ring 59 which tears from the button, the tag cannot readily be applied to another animal. This is because the resultant aperture in the second button is not opened by the pointed head 56 of the pin, because the aperture in the button is too large.

Second Variant

Figure 6:
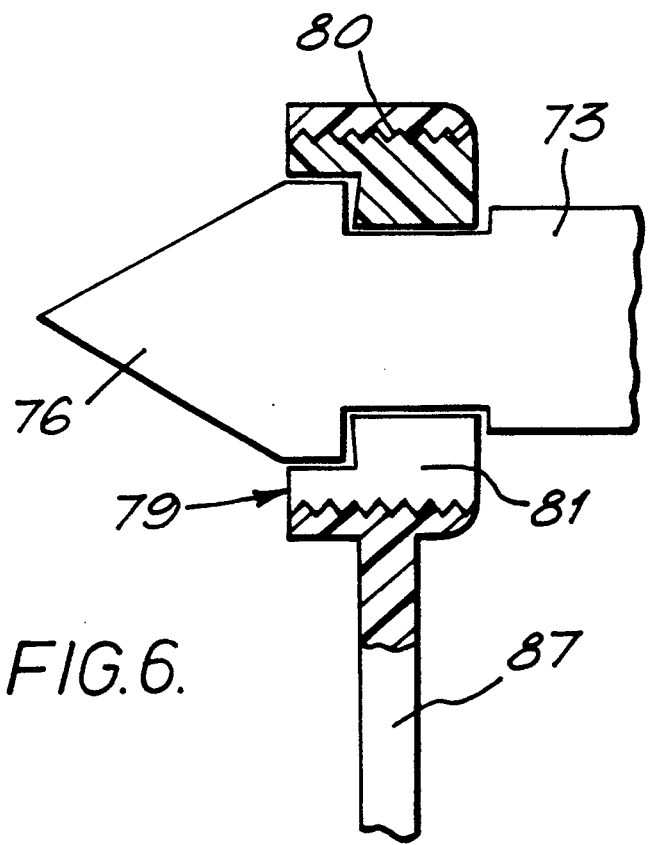
FIG. 6 is a view also similar to FIG. 3 of another variant.

In the variant of FIG. 6, the additional ring 79 is of non-corroding metal, for example stainless steel. It has a plan that is non-stepped, outer circumferential surface 80, which is knurled to provide a key for the moulded material of the second button 87, so that the ring is secured in the button. The ring has a radial slit 81, which allows the ring to expand for fitting to the head 76 of the pin 73, on application of the tag to animal. Should this ring be torn from its button, secure refitting is virtually impossible.

Third Variant

Figure 7:
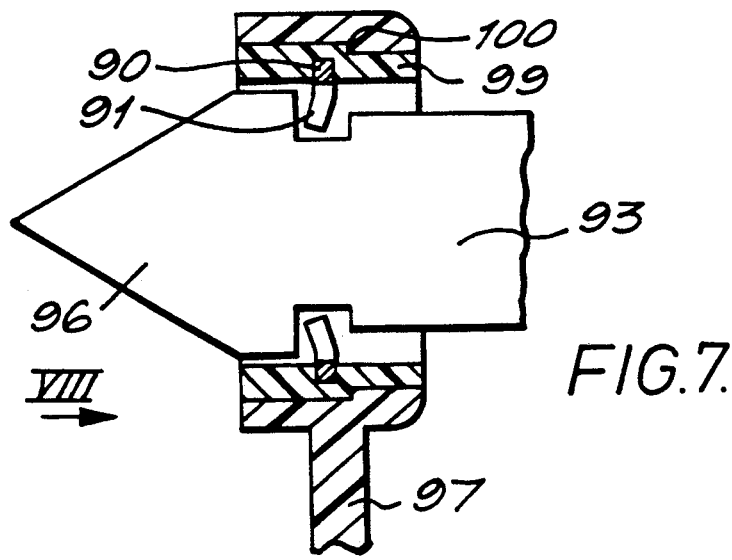
FIG. 7 is a further view similar to FIG. 3 of another variant.
Figure 8:
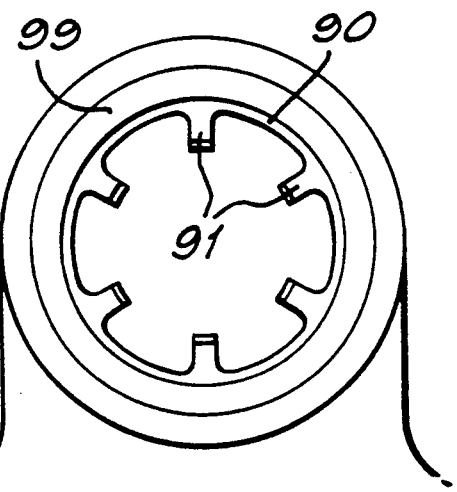
FIG. 8 is an end view of the second button of FIG. 7 in the direction of the arrow VIII in FIG. 7.

In the variant of FIGS. 7 and 8, the additional ring 99 is of nylon material with a moulded-in spring steel washer 90. This has lugs 91 extending radially inwards and slightly towards the pin head side of the ring. When the pin 93 is fitted to the second button 97, the head 96 deflects the lugs 91 which spring back behind the head to hold the tag together. This ring 99 has an outer step 100 and is thus particularly strong in resisting tampering and removal form an animal in a form able to be re-used illicitly.

Second Preferred Embodiment

Figure 9:
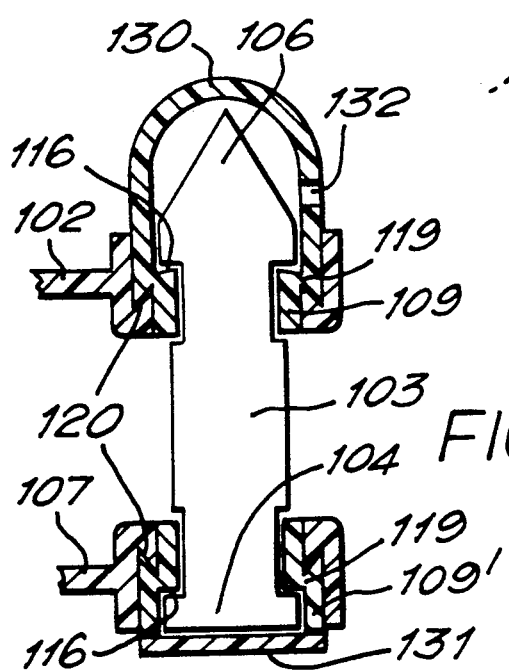
FIG. 9 is a cross-sectional scrap view similar to FIG. 1 of a second ear tag of the invention.

The ear tag shown in FIG. 9 of the drawings has a first button 107, a second button 102, and a pin 103. The pin has a heel 104 engaged with the first button 102 with the interposition of a frangible ring 109 of nylon and a head 106 engaged with the second button with the interposition of another frangible ring 109' of nylon. Each ring has a weak region 119—rendering the tag tamperproof—and an internal step 116 with which it engages the pin and an outer step 120 with which it engages its button.

The head ring 109 has an integrally moulded cap 130 which by remaining intact indicates that the pin has not been tampered with, such as by fitting of a new head. The heel ring 109' has a closure plate 131, welded on after fitting of the pin 103 to the first button 102. The closure plate 131 performs a similar function to the cap 130. The cap 130 has a ventilation aperture 132 allowing any skin carried into the cap during application of the tag to become dry and not fester.

The invention is not intended to be restricted to the details of the above described embodiments. For instance, thermoplastic polyester or other similar plastics material may be used in place of nylon for the additional ring. The undercut in the first embodiment causing the ring to be frangible can be provided in the seat 16 as opposed to in the external step 20 or indeed in both.

I claim:

1. A frangible ear tag comprising:
   a first button having an aperture;
   a pin having a head and a heel and being attached to the first button via engagement of the heel in the aperture prior to application of the tag to an animal, and
   a second button which is separate from the pin prior to application of the tag, the second button having an aperture in which the head of the pin is engaged on application of the tag, at least one of the buttons having:

an additional ring positioned in proximity to the at least one button's aperture and via which the pin engages said at least one button, wherein the additional ring comprises:

a frangible annular element provided with means for engaging said at least one of the buttons, the frangible annular element dimensioned so that on application of excessive force to the buttons in opposite directions, the additional ring breaks, allowing the frangible annular element to disengage from said at least one button having the additional ring, so as to render subsequent re-connection of said at least one button to the pin impractical.

2. An ear tag according to claim 1, wherein the additional ring is incorporated in the first button within the first button's aperture for engagement of the heel of the pin.

3. An ear tag according to claim 1, wherein the additional ring is incorporated in the second button within the second button's aperture for engagement of the head of the pin on application of the tag.

4. An ear tag according to claim 1, wherein the additional ring is in the form of an insert around which said at least one button is subsequently moulded.

5. An ear tag according to claim 1, wherein the additional ring is of resilient material and includes an internal bore of a size to permit passage of the head of the pin with resilient deformation of the additional ring on fitting of the pin to said at least one button and an axially facing seat for engagement behind the head of the pin when the additional ring recovers its shape after passage of the head.

6. An ear tag according to claim 5, wherein the seat is convexly conical.

7. An ear tag according to claim 1, wherein the additional ring has a weak region at which the frangible annular element is frangibly connected to an element retained within the said at least one button for separation of said at least one button from the pin on application of the excessive force.

8. An ear tag according to claim 7, wherein the weak region is combined with an external contour of the additional ring adapted for engagement thereof in said at least one button.

9. An ear tag according to claim 7, wherein the additional ring is incorporated in the aperture of the said at leas one of the buttons for engagement of the head of the pin and wherein the weak region is provided circumferentially around the additional ring corresponding to an outer diameter of a seat in the additional ring for the head of the pin, whereby a bore at least as large as the head of the pin is left in said at least one button after disengagement.

10. An ear tag according to claim 9, wherein the additional ring has an external step with an under cut directed towards a root of an internal step proving the seat.

11. An ear tag according to claim 7, wherein the additional ring is incorporated in the aperture of said at least one of the buttons for engagement of the heel of the pin and wherein the weak region is provided circumferentially around the additional ring corresponding to an outer diameter of a seat in the additional ring for the heel of the pin, whereby a bore at least as large as the heel of the pin is left in said at least one button after separation.

12. An ear tag according to claim 7, wherein the additional ring extends to the outer surface of said button, whereby axial force on an washer during application of the tag is reacted to a fitting tool.

13. An ear tag according to claim 1, wherein the additional ring has an outer enclosure member, whereby the head of the pin, is enclosed.

14. An ear tag according to claim 13, wherein the outer enclosure member is integrally formed with the additional ring.

15. An ear tag according to claim 13, wherein the outer enclosure member is provided with at least one ventilation aperture.

16. An ear tag according to claim 15, wherein the additional ring is of moulded plastics materials.

17. An ear tag according to claim 1, wherein the additional ring is of resilient material and includes an internal bore of a size to permit passage of the head of the pin with resilient deformation of the additional ring on fitting of the pin to said at least one button and an axially facing seat for engagement behind the heel of the pin when the additional ring recovers its shape after passage of the heel.

18. An ear tag according to claim 1, wherein the additional ring has an outer enclosure member, whereby the heel of the pin, is enclosed.

19. A frangible ear tag comprising:

a first button having an aperture;

a pin having a head and a heel and being attached to the first button via engagement of the heel in the aperture prior to application of the tag to an animal, and a second button which is separate from the pin prior to application of the tag, the second button having an aperture in which the head of the pin is engaged on application of the tag, at least one of the buttons having:

an additional ring positioned in proximity to the at least one button's aperture and via which the pin engages said button, said additional ring fabricated from plastics material with a moulded-in spring steel washer having lugs extending radially inward for engagement behind the head of the pin on application of the tab, wherein the moulded-in spring steel washer functions as a separate annular element that engages said at least one of the buttons behind the head of the pin on application of the tag, the annular element dimensioned so that on application of excessive force to the buttons in opposite directions, the separable annular element disengages from said at least one button having the additional ring, so as to render subsequent re-connection of said at least one button having the additional ring to the pin impractical.

20. A frangible ear tag comprising:

a first button having an aperture;

a pin having a head and a heel and being attached to the first button via engagement of the heel in the aperture prior to application of the tag to an animal, and a second button which is separate from the pin prior to application of the tag, the second button having an aperture in which the head of the pin is engaged on application of the tag, at least one of the buttons having:

an additional ring positioned in proximity to the at least one button's aperture and via which the pin engages said button, wherein the additional ring is fabricated from a non-corroding metal and is adapted for diametric expansion on fitting of the pin to said at least one button, wherein said additional ring on application of excessive force to the buttons in opposite directions, disengages from said at least one button having the additional ring, so as to render subsequent re-connection of said at least one button having the additional ring to the pin impractical.

* * * * *